UNITED STATES PATENT OFFICE.

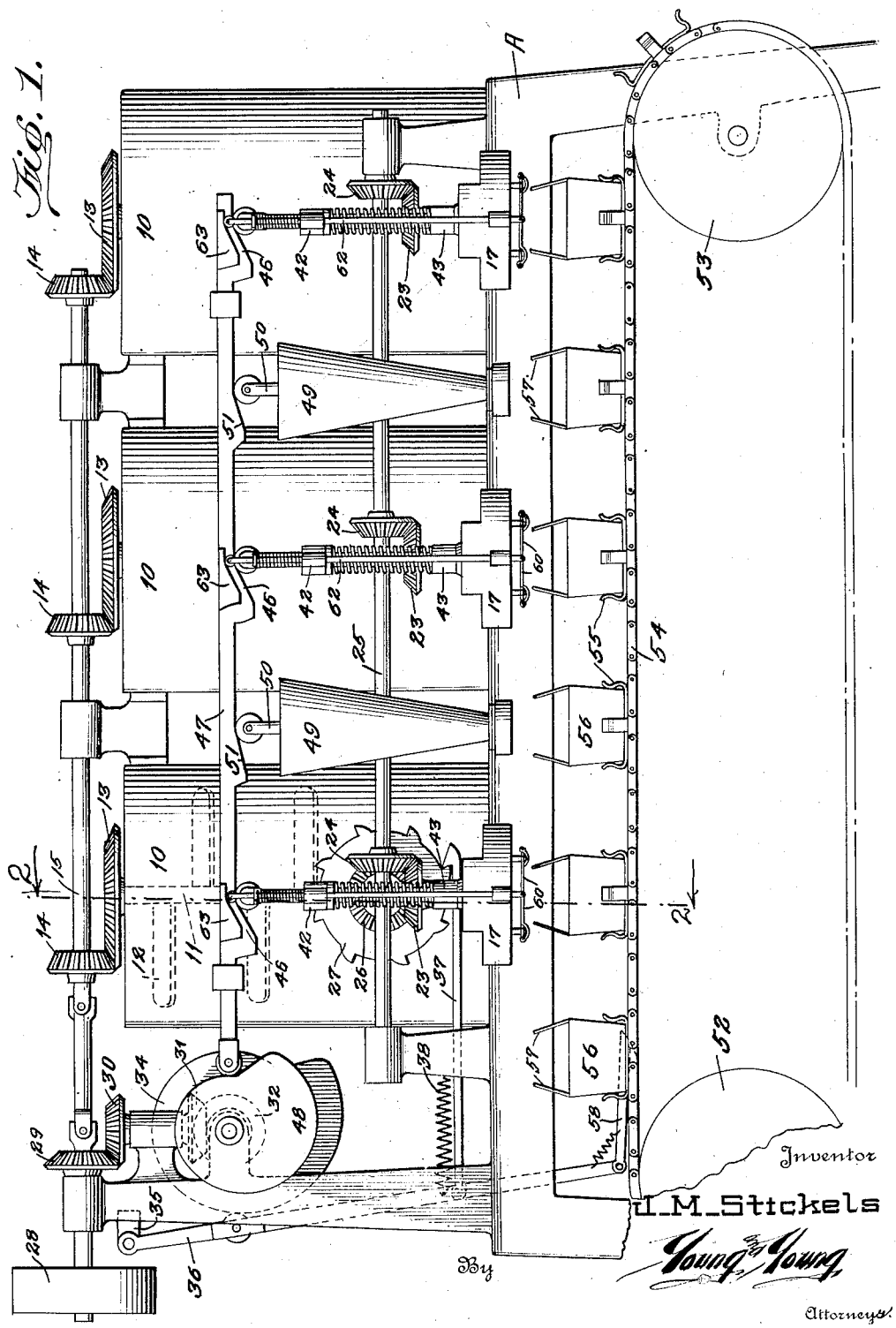

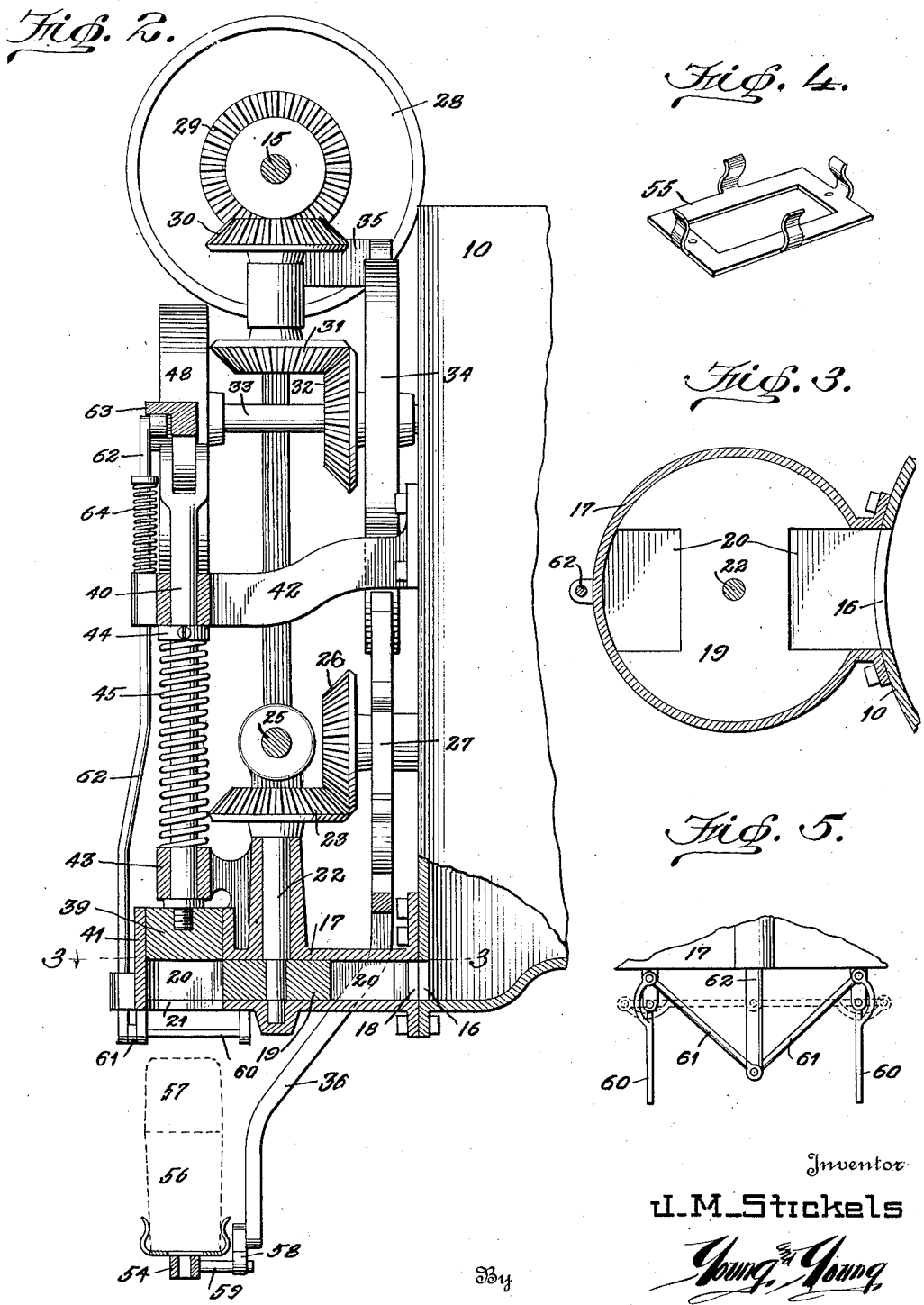

JESSE M. STICKELS, OF MILWAUKEE, WISCONSIN.

ICE-CREAM-BRICK-PACKING MACHINE.

1,382,141.   Specification of Letters Patent.   Patented June 21, 1921.

Application filed May 26, 1920. Serial No. 384,457.

*To all whom it may concern:*

Be it known that I, JESSE M. STICKELS, a citizen of the United States, and resident of Milwaukee, in the county of Milwaukee and State of Wisconsin, have invented certain new and useful Improvements in Ice-Cream-Brick-Packing Machines; and I do hereby declare that the following is a full, clear, and exact description thereof.

My invention relates to improvements in filling or packing machines, and it aims to provide a compact arrangement of automatically operating mechanisms for depositing predetermined quantities of material in containers.

The present machine is designed, primarily, for filling cartons with ice cream or other similar plastic material, and it is a purpose thereof to provide means whereby layers of ice cream of different flavors and, if desired, nuts, fruit or the like between the different layers, may be packed in cartons or containers of the usual well known type with facility and without requiring the attention or handling of the ice cream by an attendant.

I am enabled to accomplish the foregoing purposes by reason of the provision in my improved machine, of certain novel arrangements, constructions, and combinations of parts coöperating to produce the desired results and it is in these novel features of my machine, as illustrated in the accompanying drawings, that my invention, as defined in the appended claims, consists.

In the drawings:—

Figure 1 is a front elevation of a machine constructed in accordance with my invention, Fig. 2 is a vertical section on the line 2—2 of Fig. 1, Fig. 3 is a horizontal section on the line 3—3 of Fig. 2, Fig. 4 is a detail perspective of a retaining clip for one of the cartons, and Fig. 5 is a detail illustrating the means for automatically effecting the opening of the carton cover flaps.

Referring to the drawings, in detail, A designates a suitable base, frame or table formed from any desired or suitable material, and upon which the various parts of my machine are mounted. Arranged in a row on this base are a plurality of spaced containers 10 of similar construction and of any desired number, and each containing a different flavor or kind of ice cream. Arranged in each of these containers is a suitable device designed to continuously operate to move the mass of material within the containers toward their bottoms, and as illustrated in dotted lines in Fig. 1, such means in each container may consist of a vertical shaft 11 carrying spiral blades 12, but it will be obvious that other means might be readily placed in the containers in lieu of the means shown and serve the purpose quite as well. However, the means shown is a desired arrangement, and upon the upper end of each shaft 11 is mounted a bevel gear 13 with which meshes a similar gear 14 fixed on a shaft 15 which extends longitudinally of the machine above the containers 10, and is driven in any preferred manner to impart rotation to the shafts 11 and the spiral blades.

At or near their bottoms each of the containers is provided with an opening 16 through which the ice cream, as it is forced down by the blades 12, may escape. Secured to each container and covering the opening 16 therein is a housing 17 of substantially circular shape and of a depth, interiorly, corresponding to the thickness of the layer of ice cream it is desired to place in a carton. An opening 18 in each housing is disposed in alinement with the respective openings in the containers, whereby a free communication is provided between the housings and containers for a purpose which will presently appear.

Snugly arranged in each housing and rotated therein is a disk 19 which is recessed or cut away as at 20 in as many places as is permitted by the size of the disk or in as many places as may be desired. These recesses are of a length, preferably, corresponding to the length of the openings 16 and 18, and are of a width corresponding to the width of the cartons within which it is desired to pack the layers of ice cream. For this reason it is found desirable to provide the disk with but two of such recesses and for convenience in designing the other parts of the machine to place these recesses in the disk at diametrically opposite points. An opening 21 is formed in the bottom wall of each housing 17, remote from the openings 18, and such openings correspond in shape to the respective recesses 20 in the disk. Thus upon intermittent rotation of the disks, whereby the respective recesses 20 therein are brought into registration successively with the openings 16, 18 and the opening 20 in each housing, the ice cream in the containers will be fed into the recesses and carried with each disk to the opening 21 in its housing, at which point it may be discharged through said opening. Fixed quantities with predetermined shape of the ice cream thus may be continuously withdrawn from the containers.

The means for rotating each disk 19 intermittently, consists of a vertical shaft 22 having a disk fixed thereto at its lower end and at its upper end carrying a bevel gear 23 with which meshes a like gear 24 on a shaft 25 arranged longitudinally of the machine above the housings 17. Meshing with one of the gears 23 and one of the gears 24 is a bevel gear 26 on a stub shaft, which stub shaft also carries a ratchet wheel 27. Driven from a pulley 28 on a main drive shaft, (which also drives the gears 14 and 13) through bevel gears 29, 30, 31 and 32, is a transverse shaft 33 which carries a cam 34. Pivoted at its upper end to a bearing standard 35 is a lever 36 having an intermediate portion operatively disposed with respect to said cam and near its lower end having connected thereto, an arm 37 so constructed as to engage the teeth of the ratchet 27 and impart a partial rotation thereto upon each revolution of the cam, the lever being maintained in engagement with the cam by a spring 38 connected to the lever and to a suitable fixed portion of the machine and being rotated upon the pivot by the cam to reciprocate the arm 37 as is apparent. The ratchet movement and the gears are of course so timed that a single revolution of the cam shaft results in a half revolution of the disks.

In addition to the foregoing, I have provided means for positively forcing the layers of ice cream from the recesses in the disks 17 through the openings 21. This means consists of a plunger 39 on the lower end of a shaft 40 associated with each housing 17. These plungers are mounted in suitable guides 41 rising from the housings 17 in alinement with the openings 21 and the shafts 40 are guided in suitable upper and lower bearings 42 and 43. Between each lower bearing and a collar 44 on each shaft 40 is arranged an expansion spring 45 acting to normally maintain the associated plunger 39 up and out of the housing 17. The upper end of each shaft 40 is operatively associated with a cam face 46 on a bar 47 arranged longitudinally of the machine, whereby when the bar is moved longitudinally in one direction the shafts 40 and consequently the plungers 39 are forced downward. Longitudinal movement of the bar is effected by a cam 48 on the shaft 33 which is arranged to move the bar at the proper time, when the recesses in the disks are in alinement with the openings 21, to cause the plungers to eject the material from the recesses and through said openings.

At points half way between the respective housings 17 I provide nut or fruit containers 49 and similarly to the housings 17, these containers are each provided with a vertical shaft 50 operated by a cam 51 on the bar 47 to cause a predetermined amount of nuts or fruit to be discharged therefrom whenever the bar is moved in a direction resulting in forcing the shafts 50 downward.

Upon sprockets 52 and 53 disposed at opposite ends of the machine I provide an endless conveyer 54 and at spaced intervals thereon mount retaining clips 55, such as are best illustrated in Fig. 4 of the drawings, to receive cartons 56 having cover flaps 57. This conveyer extends longitudinally of the machine below the housings 17 and in alinement with the openings 21 and the lower discharge ends of the fruit or nut containers 49, so that when the layers of ice cream, nuts or fruit are discharged the cartons will be in position to receive them. The conveyer is advanced intermittently and in proper timed relation to the other parts of the machine by means of an arm 58 on the extreme lower end of the lever 36, said arm being provided with a hook engaging over spaced pins 59 carried by the conveyer.

From the foregoing, it will be observed that when the machine is in operation the cartons are progressively advanced past the respective ice cream and fruit or nut containers, and that the machine operates to deposit first a layer of one kind and then a layer of another kind in the cartons, each container constituting a "station" at which each carton as it advances becomes partially filled.

Since the cover flaps of the cartons must be held open during the filling operations, I have provided means for accomplishing this purpose, such means consisting of opposed plates 60 pivoted to the lower face of each housing 17 and, as best illustrated in Fig. 5, these plates are connected by links 61 with the lower ends of rods 62 which extend upward, and at their upper ends are operatively associated with cams 63 on the bar 47 which operate, when the bar is moved longitudinally, to force the rods 62 downward and swing the plates from the dotted line position in Fig. 5 to the full line position. As they move down these plates engage with the partially upturned flaps of the carton and move them out of the path of the descending ice cream blocks or layers. Springs 64 between collars on the rods 62 and suitable fixed portions of the machine serve to return the plates to the dotted line position in Fig. 5, following each movement of the bar 47.

It is believed that the construction, and operation of my improved filling machine will be thoroughly understood from the foregoing description taken in connection with the accompanying drawings, and while I have disclosed certain preferred manners of accomplishing the desired results, it will be apparent that various minor changes may be made in the machine without departing from its spirit or sacrificing any of its advantages. I therefore do not restrict myself in any way to what I have herein illustrated and described, as except to the extent set forth in the appended claims.

Having thus fully described my invention, what I claim as new, and desire to secure by Letters Patent, is:—

1. A filling machine comprising a plurality of material containers, rotary means for receiving material therefrom, means for intermitently rotating said receiving means, and means for forcing the material from said receiving means including a horizontal bar arranged for interrupted movement and a vertical movable bar operated by the first said bar.

2. In a filling machine, in combination, a plurality of containers, a conveyer for carrying cartons to be filled, said cartons having cover flaps, means for delivering predetermined quantities of material from each container to each carton including a longitudinally movable bar, and means for opening said cover flaps, said last means being operable from said bar.

In testimony that I claim the foregoing I have hereunto set my hand at Milwaukee, in the county of Milwaukee and State of Wisconsin.

JESSE M. STICKELS.